US009144942B2

(12) United States Patent
Samejima et al.

(10) Patent No.: US 9,144,942 B2
(45) Date of Patent: Sep. 29, 2015

(54) METHOD FOR PRODUCING FIBER-REINFORCED PLASTIC MOLDING, PREFORM AND METHOD FOR PRODUCING SAME, AND ADHESIVE FILM

(75) Inventors: Sohei Samejima, Chiyoda-ku (JP); Hajime Takeya, Chiyoda-ku (JP); Michihito Matsumoto, Chiyoda-ku (JP); Kazuki Kubo, Chiyoda-ku (JP); Yuhei Awano, Chiyoda-ku (JP); Takahiro Mabuchi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 87 days.

(21) Appl. No.: 13/822,154

(22) PCT Filed: May 12, 2011

(86) PCT No.: PCT/JP2011/060978
§ 371 (c)(1),
(2), (4) Date: Mar. 11, 2013

(87) PCT Pub. No.: WO2012/066805
PCT Pub. Date: May 24, 2012

(65) Prior Publication Data
US 2013/0177727 A1    Jul. 11, 2013

(30) Foreign Application Priority Data

Nov. 19, 2010   (JP) .................................. 2010-258618

(51) Int. Cl.
*B29C 70/02* (2006.01)
*B29C 70/34* (2006.01)
(Continued)

(52) U.S. Cl.
CPC ............. *B29C 70/021* (2013.01); *B29C 70/342* (2013.01); *B32B 5/02* (2013.01);
(Continued)

(58) Field of Classification Search
CPC ...... B29C 70/30; B29C 70/205; B29C 70/48; B29C 70/18; B29C 70/021; B32B 2255/00; B32B 2260/023
See application file for complete search history.

(56) References Cited

U.S. PATENT DOCUMENTS 5,176,949 A * 1/1993 Allagnat et al. .............. 428/198
5,721,051 A * 2/1998 White et al. .................. 428/413
(Continued)

FOREIGN PATENT DOCUMENTS

| CN | 1139901 A | 1/1997 |
| CN | 1261303 A | 7/2000 |

(Continued)

OTHER PUBLICATIONS

Translation of JP62184011A to Eiichiro Takiyama, published Aug. 12, 1987, 2 pages.*

(Continued)

*Primary Examiner* — Matthew Daniels
(74) *Attorney, Agent, or Firm* — Oblon, McClelland, Maier & Neustadt, L.L.P.

(57) ABSTRACT

The present invention is a method for producing a fiber-reinforced plastic molding including, in the following order, the steps of: forming a preform laminate fixed to a molding die by laminating a plurality of preforms each including a dry fiber fabric and a fixing resin, the preforms being laminated through the fixing resin formed on a surface of the dry fiber fabric and including a partially-cured thermosetting resin exhibiting tackiness at a room temperature; impregnating the dry fiber fabric, provided in the preform laminate fixed to the molding die, with a liquid thermosetting resin; curing the liquid thermosetting resin and the fixing resin to form a fiber-reinforced plastic molding; and demolding the fiber-reinforced plastic molding from the molding die.

2 Claims, 3 Drawing Sheets

(51) Int. Cl.
  *B32B 5/26* (2006.01)
  *C08J 5/24* (2006.01)
  *C09J 4/00* (2006.01)
  *B32B 5/02* (2006.01)
  *B32B 27/12* (2006.01)
  *C09J 7/02* (2006.01)

(52) U.S. Cl.
  CPC ............ *B32B 5/26* (2013.01); *B32B 27/12* (2013.01); *C08J 5/24* (2013.01); *C09J 4/00* (2013.01); *C09J 7/0225* (2013.01); *B32B 2260/021* (2013.01); *Y10T 428/1476* (2015.01); *Y10T 428/24802* (2015.01); *Y10T 428/249921* (2015.04)

(56) References Cited

U.S. PATENT DOCUMENTS

| | | | |
|---|---|---|---|
| 5,766,534 A | 6/1998 | White et al. | |
| 8,546,486 B2 * | 10/2013 | Zhao et al. | 525/34 |
| 2002/0022422 A1 * | 2/2002 | Waldrop et al. | 442/179 |
| 2006/0073300 A1 * | 4/2006 | Pearson et al. | 428/40.1 |
| 2008/0099131 A1 | 5/2008 | Umeda et al. | |
| 2009/0076218 A1 * | 3/2009 | Zhao et al. | 524/599 |

FOREIGN PATENT DOCUMENTS

| | | | |
|---|---|---|---|
| JP | 60 83826 | | 5/1985 |
| JP | 62184011 A | * | 8/1987 |
| JP | 2 16114 | | 1/1990 |
| JP | 9 508082 | | 8/1997 |
| JP | 2001 524171 | | 11/2001 |
| JP | 2002 270708 | | 9/2002 |
| JP | 2004 114586 | | 4/2004 |
| JP | 2004 269705 | | 9/2004 |
| JP | 2005 231044 | | 9/2005 |
| JP | 2006 256202 | | 9/2006 |
| JP | 2007 182661 | | 7/2007 |
| JP | 2008 110539 | | 5/2008 |
| JP | 2009 545686 | | 12/2009 |
| JP | 2010 37694 | | 2/2010 |
| WO | WO 98/50211 A1 | | 11/1998 |

OTHER PUBLICATIONS

Combined Chinese Office Action and Search Report issued Sep. 29, 2014 in Application No. 201180051210.8 (with Partial English Translation and English Translation of Category of Cited Documents).

International Search Report Issued Aug. 16, 2011 in PCT/JP11/60978 Filed May 12, 2011.

* cited by examiner (a)

(b)

(c)

VACUUM-ABSORBING

INFUSING RESIN

METHOD FOR PRODUCING FIBER-REINFORCED PLASTIC MOLDING, PREFORM AND METHOD FOR PRODUCING SAME, AND ADHESIVE FILM

TECHNICAL FIELD

The present invention relates to a method for producing a fiber-reinforced plastic molding under a pressure-reduced atmosphere, a preform used in the method, a method for producing the preform, and an adhesive film used for producing the preform.

BACKGROUND ART

Fiber-reinforced plastic (FRP) attracts attention in various industrial fields as light-weighted and high-strength material. In recent years, to produce a relatively large fiber-reinforced plastic molding at a low cost, there has been employed a vacuum assist resin transfer molding (VaRTM) for molding fiber-reinforced plastic under a pressure-reduced atmosphere by means of vacuum absorption. The vacuum assist resin transfer molding is a method for obtaining a fiber-reinforced plastic molding including the steps of covering a dry fiber fabric arranged in a molding die with a bag film, vacuum-absorbing the bag film, infusing a liquid resin into the bag film, impregnating the fiber fabric with resin, and curing the resin (for example, refer to PTL1: Japanese Patent Laying-Open No. 60-83826).

However, since a dry fiber fabric has no tackiness (viscosity), the dry fiber fabric itself cannot be fixed at a position against gravity in the step of forming into a three-dimensional shape (the step of arranging a dry fiber fabric on a molding die, the step of laminating a dry fiber fabric on a dry fiber fabric, and the like). Further, when a dry fiber fabric and a molding die, or a dry fiber fabric and a dry fiber fabric are not in sufficient contact with each other, fibers in some cases exhibited wrinkles under the pressure-reduced condition.

As a simplified method for solving such a problem, a method is conceivable using a tape to fix a portion being subject to trimming and not eventually used in a finished product. However, there is a problem that a portion which can be fixed using a tape is limited, and that the operation is cumbersome and results in low productivity.

Therefore, there have been proposed a method for fixing a dry fiber fabric with use of solution with a binder containing an amorphous thermoplastic resin (tackifier: spray) (for example, refer to PTL2: Japanese Patent Laying-Open No. 2004-269705) and a method for shortening the step of laminating dry fiber fabrics by adhering a plurality of fiber fabrics each other in advance by means of an adhesive resin composed of a mixture of a thermoplastic resin (toughness) and thermosetting resin (for example, refer to PTL3: Japanese Patent Laying-Open No. 2004-114586).

The method disclosed in PTL2 can be used in the step of arranging a dry fiber fabric on a molding die and in the step of laminating a dry fiber fabric on a dry fiber fabric, allowing the operation time to be shortened. However, when the method is used in the step of arranging a dry fiber fabric on a molding die, a non-cured thermoplastic component is exposed at the surface of a demolded fiber-reinforced plastic molding. Therefore, there has been a problem that the surface which was in contact with the molding die may become sticky and that a thermoplastic component may exhibit white dots to cause poor appearance.

Further, the method disclosed in PTL 3 can be used in the step of laminating a dry fiber fabric on a dry fiber fabric, allowing the operation time to be shortened. However, the method cannot be used in the step of arranging a dry fiber fabric on a molding die. Further, when a plurality of fiber fabrics are combined in advance, and a large number of layers are present, shaping with respect to a bent portion becomes difficult. Particularly, the tension applied to the fiber will differ between the inside and outside, resulting in occurrence of wrinkles due to loosening of fibers.

CITATION LIST

Patent Literature

PTL 1: Japanese Patent Laying-Open No. 60-83826
PTL 2: Japanese Patent Laying-Open No. 2004-269705
PTL 3: Japanese Patent Laying-Open No. 2004-114586

SUMMARY OF INVENTION

Technical Problem

In light of the problems described above, an object of the present invention is to provide a preform which can prevent viscosity on a surface and poor appearance due to occurrence of white dots in a fiber-reinforced plastic molding which can be obtained by a method for producing a fiber-reinforced plastic molding under a pressure-reduced atmosphere, and which can be used in both of the step of fixing a dry fiber fabric on a molding die and the step of laminating dry fiber fabrics, a method for producing the preform, and an adhesive film used for producing the preform.

Solution to Problem

The present invention is directed to a method for producing a fiber-reinforced plastic molding including, in the following order, the steps of: forming a preform laminate fixed to a molding die by laminating a plurality of preforms each including a dry fiber fabric and a fixing resin, the preforms being laminated through the fixing resin formed on a surface of the dry fiber fabric and including a partially-cured thermosetting resin exhibiting tackiness at a room temperature; impregnating the dry fiber fabric, provided in the preform laminate fixed to the molding die, with a liquid thermosetting resin; curing the liquid thermosetting resin and the fixing resin to form a fiber-reinforced plastic molding; and demolding the fiber-reinforced plastic molding from the molding die.

In the step of forming the laminate, the plurality of preforms are laminated taking in consideration of fiber orientation of the dry fiber fabric to fabricate a preform laminate, and thereafter the preform laminate can be fixed to the molding die.

In the step of forming a laminate, after fixing the preform to the molding die through the fixing resin, at least one preform may be further laminated through the fixing resin.

The fixing resin is a vinyl ester resin having both of a (meta-) acryloyl group and an epoxy group in an identical resin skeleton and is a partially-cured resin with the solely reacted epoxy group. The liquid thermosetting resin is a vinyl ester resin, and the fixing resin and the liquid thermosetting resin are preferably cured at the same time in the step of curing.

In the step of curing, curing of the thermosetting resin is preferably performed by a stepcure, and complete curing of the fixing resin is preferably performed during an aftercure of the liquid thermosetting resin. The dry fiber fabric is a carbon fiber, and the fixing resin preferably includes carbon black.

Further, the present invention also relates to a preform used for producing a fiber-reinforced plastic molding, and the preform includes a dry fiber fabric and a fixing resin. The fixing resin is formed on a surface of the dry fiber fabric and includes a partially-cured thermosetting resin exhibiting tackiness at a room temperature. The fixing resin is preferably formed in a regular dot pattern.

Further, the present invention also relates to a method for producing the preform, including the step of transferring the fixing resin to the dry fiber fabric.

Preferably, in the step of transferring, an adhesive film including a release paper or release film and a fixing resin, formed on a surface of the release paper or release film and including a partially-cured thermosetting resin exhibiting tackiness at a room temperature, is brought into close contact with the dry fiber fabric to transfer the fixing resin to the dry fiber fabric.

Further, the present invention also relates to an adhesive film including a release paper or release film and a fixing resin, formed on a surface of the release paper or release film and including a partially-cured thermosetting resin exhibiting tackiness at a room temperature.

Preferably, the adhesive film is used for the method for producing a preform. Preferably, the fixing resin is formed in a regular pattern so as to cover 0.05%-5% of an area of the release paper or release film. Preferably, the fixing resin is formed in a regular dot pattern.

Advantageous Effects to Invention

A fixing resin used in the present invention (a partially-cured thermosetting resin exhibiting tackiness at room temperature) does not contain a large amount of thermoplastic component. Therefore, even when the fixing resin is used on a surface in contact with a molding die, no viscosity and white dot occur. Therefore, a fiber-reinforced plastic molding exhibiting fine appearance can be obtained.

Further, a preform of the present invention includes the fixing resin. Therefore, a position of the preform can be fixed without being affected by gravity, so that the step of shaping into a three-dimensional shape (the step of arranging a dry fiber fabric on a molding die, the step of laminating a dry fiber fabric on a dry fiber fabric, and the like) can be simplified, resulting in improved productivity.

DESCRIPTION OF EMBODIMENTS

<Preform>

A preform of the present invention is a member including a dry fiber fabric and a fixing resin, and the fixing resin is formed on a surface of the dry fiber fabric and includes a partially-cured thermosetting resin exhibiting tackiness at a room temperature. The preform is used for producing a fiber-reinforced plastic molding. Herein, the surface of the dry fiber fabric does not include an inner surface within a space in the fiber fabric.

Preferably, the fixing resin is formed so as not to interrupt impregnation of a dry fiber fabric with a liquid thermosetting resin as will described later. For example, the fixing resin is preferably formed in a dot pattern or in a spider web pattern, and more preferably formed in the dot pattern. Accordingly, impregnation of the liquid thermosetting resin is not interrupted even in the area to which the fixing resin is transferred.

<Method for Producing Preform>

Figure 2:
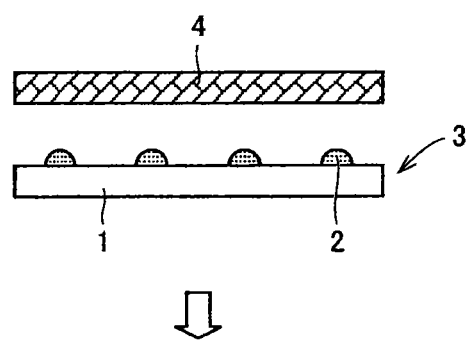
FIGS. 2(a)-2(c) are cross-sectional views schematically presenting an example of the steps for producing a preform of the present invention.
Figure 2:
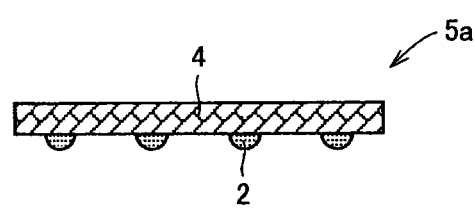
Figure 2:
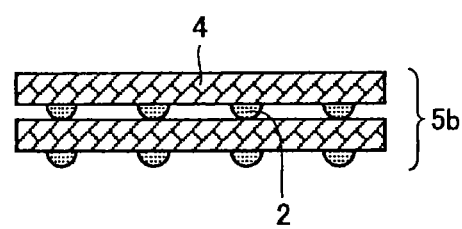

Next, a method for producing a preform will be described. FIG. 2 shows an example of the steps for producing a preform of the present invention. Firstly, from the state shown in FIG. 2(a), a fixing resin 2 of an adhesive film 3 is brought into contact with one side surface of a dry fiber fabric 4. Then, a release film 1 is peeled off to obtain a preform 5a shown in FIG. 2(b) with fixing resin 2 attached to the one side surface of dry fiber fabric 4.

As described above, the method for producing a preform according to the present invention preferably includes the transferring step of transferring a fixing resin to a dry fiber fabric. Further, in the step of transferring, an adhesive film including a release paper or release film and a fixing resin (a partially-cured thermosetting resin exhibiting tackiness at a room temperature) formed on a surface of the release paper or release film are preferably brought into close contact with a dry fiber fabric to transfer the fixing resin to the dry fiber fabric.

Further, as shown in FIG. 2(c), another preform 5a fabricated in a similar manner may be laminated on preform 5a through fixing resin 2, so that a preform laminate 5b composed of a plurality of laminated preforms 5a can be obtained. As described above, fabricating a preform laminate in advance eliminates the necessity to shape all of preforms 5a one by one on a molding die.

Dry fiber fabric 4 may be a fabric of a carbon fiber, a glass fiber, a Zyron fiber, a Kevlar fiber, and the like. Preferably, a fabric of a carbon fiber and a glass fiber may be used.

<Adhesive Film>

Next, an adhesive film used in the method for producing a preform will be described. An adhesive film of the present invention includes a release paper or release film, and a fixing resin (a partially-cured thermosetting resin exhibiting tackiness at a room temperature) formed on a surface thereof the release paper or release film.

Figure 1A:
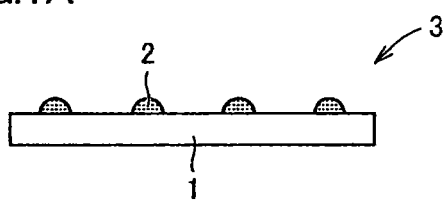
FIG. 1A is a cross-sectional view schematically presenting an example of an adhesive film of the present invention.
Figure 1B:
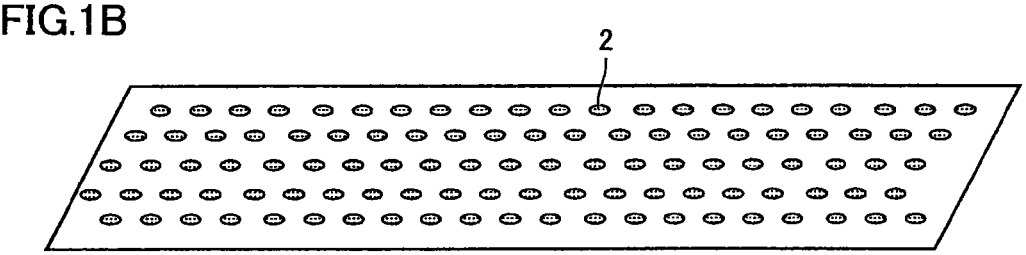
FIG. 1B is a perspective view of FIG. 1A.

An example of the adhesive film of the present invention is shown in FIG. 1A and FIG. 1B. FIG. 1A is a schematic cross-sectional view, and FIG. 1B is a perspective view. As shown in FIGS. 1A and 1B, adhesive film 3 includes release film 1 and fixing resin 2 (a partially-cured thermosetting resin exhibiting a tackiness at the room temperature) formed on release film 1 in a regular dot pattern.

The fixing resin may be, for example, an epoxy resin, a polyimide resin, and a phenol resin, but is not particularly limited as long as the fixing resin is a partially-cured thermosetting resin exhibiting tackiness at a room temperature. Preferably, the fixing resin is a vinyl ester resin having both of an (meta-) acryloyl group and an epoxy group in an identical resin skeleton. The fixing resin may contain pigment such as carbon black. The fixing resin may contain a small amount of tackifier such as rosin ester. Further, a release paper or the like may be used in place of the release film.

Figure 1C:
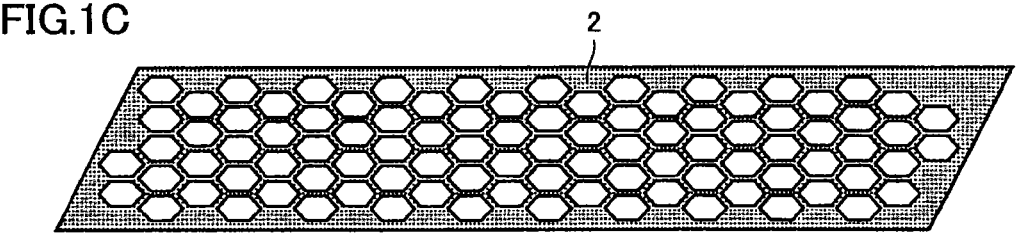
FIG. 1C is a perspective view presenting another example of an adhesive film of the present invention.

Another example of the adhesive film of the present invention is shown in FIG. 1C. In place of the adhesive film with a fixing resin formed in a regular dot pattern shown in FIGS. 1A and 1B, an adhesive film with a fixing resin formed in a regular spider web pattern shown in FIG. 1C may be employed.

Preferably, the fixing resin is formed in a regular pattern so as to cover 0.05% -5% of an area of the release paper or release film. This is because the fixing resin may fall down following gravity in the case of being less than 0.05% and may inhibit impregnation of resin in the case of being greater than 5%.

Using the adhesive film according to the present invention allows production of a preform merely by transferring a fixing resin to a dry fiber fabric, so that a needed amount of fixing resin can be suitably used at a needed part.

<Method for Producing a Fiber-Reinforced Plastic>

Next, a method for producing fiber-reinforced plastic will be described. A method for producing fiber-reinforced plastic according to the present invention includes, in the following order, the steps of: forming a preform laminate fixed to a molding die by laminating a plurality of preforms each including a dry fiber fabric and a fixing resin, the preforms being laminated through the fixing resin formed on a surface of the dry fiber fabric and including a partially-cured thermosetting resin exhibiting tackiness at a room temperature; impregnating the dry fiber fabric, provided in the preform laminate fixed to the molding die, with a liquid thermosetting resin; curing the liquid thermosetting resin and the fixing resin to form a fiber-reinforced plastic molding; and demolding the fiber-reinforced plastic molding from the molding die.

A first embodiment of the step of forming a laminate may include the method of laminating a plurality of preforms taking in consideration of fiber orientation of a dry fiber fabric to fabricate a preform laminate, and thereafter fixing the preform laminate to a molding die. According to this method, the preform laminate is formed in advance. Therefore, all of preforms are not required to be shaped one by one on the molding die, so that the operation of laminating the fibers can be shortened. However, since wrinkles may occur at a bent portion when fixed to the molding die, limiting the thickness of such portion or partially avoiding formation of the fixing resin are preferable to prevent occurrence of wrinkles at the time of fixing (shaping) the preform laminate to the molding die.

A second embodiment of the step of forming a laminate may include the method of attaching preforms to a molding die one by one to eventually obtain a preform laminate fixed to the molding die, in other words, the method of fixing a preform to a molding die through a fixing resin and further laminating at least one preform through a fixing resin. According to this method, a preform laminate having an appropriate shape in conformity with a shape of the molding die can be shaped (formed and fixed).

A specific example of the first embodiment of the step of forming a laminate may include, for example, the method of shaping and fixing a preform laminate fabricated in advance to a molding die, covering the preform laminate fixed to the molding die with a bag film and the like, vacuum-absorbing the bag, and impregnating the dry fiber fabric in the preform laminate with a liquid thermosetting resin.

Figure 3:
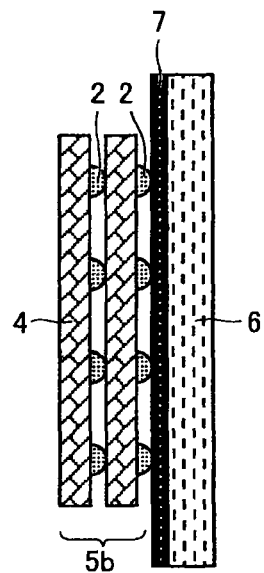
FIG. 3 is a cross-sectional view schematically presenting a method according to the present invention for shaping a preform into a molding die.
Figure 4:
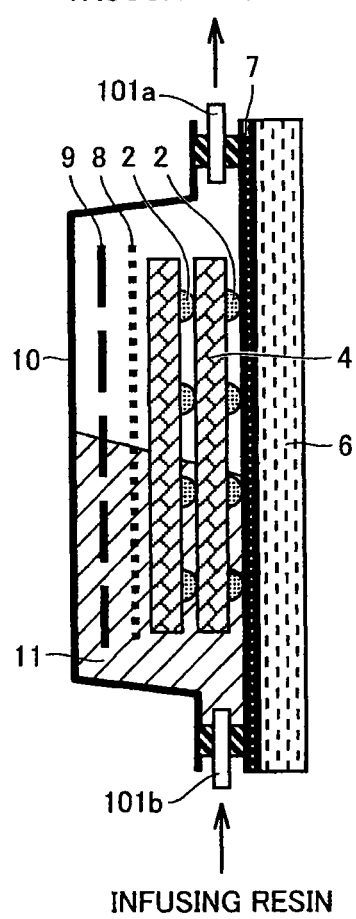
FIG. 4 is a cross-sectional view schematically presenting a condition of the step of impregnating in the method for producing a fiber-reinforced plastic molding according to the present invention.

With reference to FIGS. 3 and 4, an example of a method for producing a fiber-reinforced plastic molding using the first embodiment of the step of forming a laminate will be described. Firstly, as shown in FIG. 3, a molding die 6 is prepared having a surface processed with a Teflon (registered trademark) coating 7, and preform laminate 5b is brought into contact with molding die 6 through fixing resin 2 and fixed. Accordingly, fixing resin 2 fixes dry fiber fabric 4 to Teflon (registered trademark) coating 7 on the surface of molding die 6. Therefore, no positional displacement due to gravity occurs.

Next, as shown in FIG. 4, a peel ply 8 and a flow media 9 are arranged on preform laminate 5b, and the entirety is covered with a bagging film 10 and sealed. At this stage, Teflon (registered trademark) tubes 101a, 101b are provided at two locations on the edges of the sealed space and stopped with valves. Further, Teflon (registered trademark) tube 101a is connected to a vacuum pump, and Teflon (registered trademark) tube 101b is connected to a resin tank.

Next, the vacuum pump is actuated to reduce pressure in the space sealed by bagging film 10. After the pressure is reduced in the sealed space, a valve of Teflon (registered trademark) tube 101b on the side of the resin tank is opened, so that a liquid thermosetting resin 11 is absorbed into the sealed space of a reduced pressure. Liquid thermosetting resin 11 impregnates into dry fiber fabric 4 while expanding though a large-mesh flow media 9. When liquid thermosetting resin 11 reaches Teflon (registered trademark) tube 101a on the side of the vacuum pump, the valve of the Teflon (registered trademark) tube 101b on the resin supplying side is closed.

Then, liquid thermosetting resin 11 is left until gelated. Thereafter, the vacuum pump is disconnected, and annealing is performed using an oven or the like, so that liquid thermosetting resin 11 and fixing resin 2 are completely cured together. Finally, separation at an interface between peel ply 8 and fiber-reinforced plastic and at an interface between molding die 6 and fiber-reinforced plastic is performed, so that the fiber-reinforced plastic can be obtained.

Liquid thermosetting resin 11 is not particularly limited as long as it is a low-viscosity thermosetting resin such as an epoxy resin, a polyester resin, a vinyl ester resin, and a cyanate ester resin. However, liquid thermosetting resin 11 is preferably a vinyl ester resin.

The condition for curing the fixing resin is preferably not different from the condition for curing the liquid thermosetting resin. In the case where the fixing resin is a vinyl ester resin having both of a (meta-) acryloyl group and an epoxy group in an identical resin skeleton and is a partially-cured resin with the solely reacted epoxy group, and the liquid thermosetting resin is a vinyl ester resin, the fixing resin and the liquid thermosetting resin can be cured at the same time in the step of curing. Therefore, the steps for production can be abbreviated, resulting in advantageous improvement of the production efficiency.

The step of curing is preferably performed by the stepcure of conducting the steps of curing in a stepwise manner. The stepcure is composed of a pre-step process (precure) and a post-step process (aftercure, postcure). The precure is a pre-process step in curing a thermosetting resin, and curing is performed to an extent of not obtaining a final strength, and a main object is to form a stable shape. Generally, preliminary curing is performed at a temperature slightly below the glass-transition point. The aftercure is a curing step for obtaining the final strength and is generally performed in an environment with a higher temperature and a longer time than the precure. Performing the step of curing by the stepcure can suppress to the minimum an influence to the viscosity interface with different expansion coefficients due to thermal expansion and contraction.

During the aftercure for the liquid thermosetting resin, complete curing of the fixing resin is performed preferably. This is for preventing deterioration of strength due to uncured state of resin.

Hereinafter, the present invention will be described more in detail with examples. However, the present invention is not limited to these examples.

EXAMPLES

Example 1

Firstly, mixed solution was prepared which contains: 100 parts by weight of a vinyl ester resin (M-7000 manufactured by Showa Highpolymer Co., Ltd) having both of a (meta-) acryloyl group and an epoxy group in a resin skeleton; 3 parts by weight of an epoxy curing agent (Light Ester DM manufactured by Showa Highpolymer Co., Ltd.); and 1 part by weight of organic peroxide (328E manufactured by Showa Highpolymer Co., Ltd.).

Next, an SUS plate (thickness 0.5 mm) having a plurality of holes with a diameter of 300 μm was superimposed on PET film 1 processed to be releasable and having a thickness of 38 μm. Further on the SUS plate, the mixed solution was dropped, and printing with squeegee was performed, and then the SUS plate was released, so that the mixed solution was scattered on PET film 1. Consequently, adhesive film 3 having fixing resin 2 formed in a dot pattern as shown in FIGS. 1A and 1B was obtained. Thereafter, drying was performed at 50° C. for an hour. In such a manner, while the epoxy group of the vinyl ester resin reacted with the epoxy curing agent to increase its viscosity, and the (meta-) acryloyl group remained unreacted due to absence of a catalyst such as cobalt salt, thus a moderate tackiness (viscosity) was developed.

Next, as shown in FIG. 2, adhesive film 3 was superimposed on carbon fiber fabric 4 (T300 carbon fiber plain-woven cloth manufactured by Toray Industries, Inc.) to transfer fixing resin 2 to carbon fiber fabric 4, so that preform 5a was obtained. Next, preform 5a was superimposed on preform 5a, so that preform laminate 5b was obtained.

Next, an L-shaped member of molding die 6 (made of aluminum and having a thickness of 3 mm) having Teflon (registered trademark) coating 7 formed thereon was prepared. Next, as shown in FIG. 3, preform laminate 5b was arranged at a portion perpendicular to the ground. Here, preform laminate 5b adhered with fixing resin 2 and did not fall down by gravity.

Next, as shown in FIG. 4, peel ply 8 (BLEEDER LEASE-B manufactured by AirTech) and flow media 9 (GREEN FROW 75 manufactured by AirTech) were arranged on preform laminate 5b, and the entirety was covered with bagging film 10 (WL7400 manufactured by AirTech) and sealed with a sealing member (AT-200Y manufactured by AirTech). At this stage, tubes (outer diameter: 9.52 mm, and inner diameter: 6.35 mm) made of Teflon (registered trademark) (registered trademark, polytetrafluoroethylene) were provided at two locations on the edges of the sealed space and stopped with valves. One end was connected to a vacuum pump, and the other end was connected to a resin tank. Next, the vacuum pump was actuated to reduce pressure in the sealed space.

Next, as shown in FIG. 4, peel ply 8 (BLEEDER LEASE-B manufactured by AirTech) and flow media 9 (GREEN FLOW 75 manufactured by AirTech) were arranged on preform laminate 5b, and the entirety was covered with bagging film 10 (WL7400 manufactured by AirTech) and sealed with a sealing member (AT-200Y manufactured by AirTech). At this stage, tubes (outer diameter: 9.52 mm, and inner diameter: 6.35 mm) made of Teflon (registered trademark) (registered trademark, polytetrafluoroethylene) were provided at two locations on the edges of the sealed space and stopped with valves. One end was connected to a vacuum pump, and the other end was connected to a resin tank. Next, the vacuum pump was actuated to reduce pressure in the sealed space.

Example 2

Other than use of an epoxy resin as liquid thermosetting resin 11, fiber-reinforced plastic was produced in a manner similar to that of Example 1. Other than the above, the fiber-reinforced plastic was obtained according to the steps and conditions similar to those of Example 1.

It should be understood that the embodiments and examples disclosed herein are illustrative and non-restrictive in every respect. The scope of the present invention is defined by the terms of claims, rather than the description set forth above, and is intended to include any modifications within the scope and meaning equivalent to the terms of claims.

Reference Signs List

1 release film; 2 fixing resin; 3 adhesive film; 4 dry fiber fabric; 5a preform; 5b preform laminate; 6 molding die; 7 Teflon (registered trademark) coating; 8 peel ply; 9 flow media; 10 bagging film; 11 liquid thermosetting resin; 101a, 101b Teflon (registered trademark) tube.

The invention claimed is:

1. A method for producing a fiber-reinforced plastic molding, comprising, in cited order, the following:
    mixing vinyl ester resin having both of a (meta-) acryloyl group and an epoxy group in a resin skeleton, an epoxy curing agent, and organic peroxide to prepare a partially-cured vinyl ester resin with said epoxy group reacted solely;
    forming a preform laminate by laminating a plurality of preforms each including a dry fiber fabric and a fixing resin, the preforms being laminated through said fixing resin, said fixing resin being formed in a dot pattern on a surface of the dry fiber fabric and being said partially-cured vinyl ester resin;
    fixing the formed preform laminate to a molding die via the fixing resin of one of the preforms;
    impregnating said dry fiber fabric, provided in said preform laminate fixed to said molding die, with a liquid vinyl ester resin;
    curing said liquid vinyl ester resin and said fixing resin at the same time to form a fiber-reinforced plastic molding; and
    demolding said fiber-reinforced plastic molding from said molding die.

2. The method for producing a fiber-reinforced plastic molding according to claim 1, wherein in said curing, curing of said liquid vinyl ester resin is performed during a stepcure, and complete curing of said fixing resin is performed during an aftercure of said liquid vinyl ester resin.

\* \* \* \* \*